United States Patent
Bobrovsky et al.

(10) Patent No.: US 7,793,275 B2
(45) Date of Patent: Sep. 7, 2010

(54) METHODS AND APPARATUS TO TUNE INTERMEDIATE REPRESENTATIONS IN A MANAGED RUNTIME ENVIRONMENT

(75) Inventors: Konstantin Stanislavovich Bobrovsky, Berdks (RU); Vyacheslav Pavlovich Shakin, Novosibirsk (RU); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1191 days.

(21) Appl. No.: 11/395,832

(22) Filed: Mar. 31, 2006

(65) Prior Publication Data
US 2007/0234325 A1 Oct. 4, 2007

(51) Int. Cl.
G06F 9/45 (2006.01)
(52) U.S. Cl. .................................. 717/148; 717/151
(58) Field of Classification Search ............... 717/148, 717/118, 151
See application file for complete search history.

(56) References Cited

U.S. PATENT DOCUMENTS

| | | | | |
|---|---|---|---|---|
| 6,110,226 | A * | 8/2000 | Bothner | 717/153 |
| 6,591,416 | B1 * | 7/2003 | Bak et al. | 717/159 |
| 6,591,426 | B1 * | 7/2003 | Smith | 2/69 |
| 6,760,907 | B2 * | 7/2004 | Shaylor | 717/158 |
| 6,854,114 | B1 * | 2/2005 | Sexton et al. | 718/1 |
| 7,055,024 | B2 | 5/2006 | Khanna et al. | |
| 7,197,512 | B2 * | 3/2007 | Pharies et al. | 707/103 R |
| 7,353,504 | B2 * | 4/2008 | Lagergren | 717/151 |
| 7,434,212 | B2 * | 10/2008 | Wang | 717/148 |
| 7,530,059 | B2 * | 5/2009 | Kielstra et al. | 717/148 |
| 2002/0144243 | A1 | 10/2002 | Alexander III et al. | |
| 2003/0033344 | A1 | 2/2003 | Abbott et al. | |
| 2003/0056090 | A1 | 3/2003 | Khanna et al. | |
| 2003/0070161 | A1 * | 4/2003 | Wong et al. | 717/148 |
| 2004/0015874 | A1 * | 1/2004 | Ungar | 717/127 |
| 2006/0048114 | A1 * | 3/2006 | Schmidt | 717/148 |
| 2006/0190934 | A1 | 8/2006 | Kielstra et al. | |
| 2006/0190935 | A1 | 8/2006 | Kielstra et al. | |
| 2007/0294679 | A1 | 12/2007 | Bobrovsky et al. | |

OTHER PUBLICATIONS

Dolby, "Automatic Inline Allocation of Objects", 1997 Conference on Programming Language Design and Implementation, Proceedings of the ACM SIGPLAN 1997 conference on Programming language design and implementation, pp. 7-17.*

Jagannathan et al., "Flow-Directed Inlining", May 1996, ACM SIGPLAN Notices, vol. 31 , Issue 5, pp. 193-205.*

(Continued)

*Primary Examiner*—Wei Y Zhen
*Assistant Examiner*—Chih-Ching Chow
(74) *Attorney, Agent, or Firm*—Hanley, Flight & Zimmerman, LLC

(57) ABSTRACT

Methods and apparatus are disclosed to tune intermediate representations in a managed runtime environment. An example method disclosed herein receives a bytecode at a virtual machine during runtime, determines a method of the received bytecode, identifies an optimized intermediate representation associated with the method, and imports the optimized intermediate representation from the memory into the virtual machine. Other embodiments are described and claimed.

19 Claims, 6 Drawing Sheets

OTHER PUBLICATIONS

Ayers et al., "Aggressive Inlining", May 1997, ACM SIGPLAN Notices, vol. 32, Issue 5, pp. 134-145.*

Esposito, "Binary Serialization of ADO.NET Objects", Dec. 2002, MSDN Magzine, pp. 1-13.*

Stepanian, Brown, Kielstra, Koblents, & Stoodley, "Inlining Java Native Calls at Runtime," Copyright 2005, 11 pages.

Intel Technology Journal, "The Star JIT Compiler: A Dynamic Compiler for Managed Runtime Environments," Feb. 19, 2003, 15 pages.

Intel Technology Journal, "The Open Runtime Platform: A Flexible High-Performance Managed Runtime Environment," Feb. 19, 2003, 16 pages.

Intel Technology Journa., "Enterprise Java Performance: Best Practices," Feb. 19, 2003, 17 pages.

Kumar Shiv, Marcus Lagergren & Edwin Spear, "Java in a 64-bit World: 64-Bit Processing with the Intel Itanium Processor Family and BEA WebLogic JRockit," Jul. 8, 2003, 8 pages.

Suganuma et al., "Evolution of a Java Just-In-Time Compiler for IA-32 Platforms," pp. 767-795, vol. 48, Issue 5/6, IBM Journal of Research and Development, 2004 (27 pages).

* cited by examiner

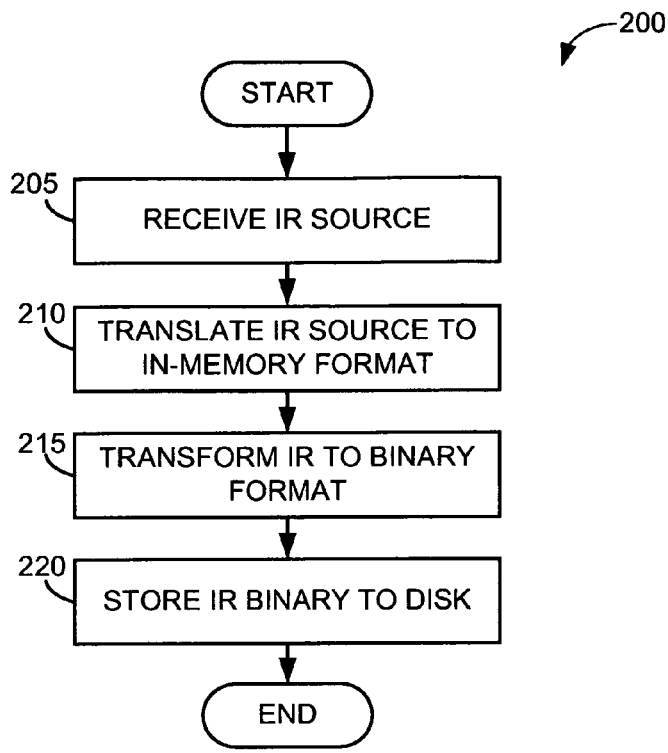

FIG. 2A

```
public static Void helloWorld(%java/lang/String[ args) {
declare out_addr = ldsflda @%java/lang/System.out:%java/io/PrintStream;
%java/io/PrintStream out = ldind out_addr, tausafe, tausafe;
%java/lang/String str = ldstr 3;
Tau out_non_null = chknull out;
Tau out_type_ok = tauhastype out, @%java/io/PrintStream;
declare out_vt = ldvtable out;
declare println_slot = ldvfnslot out_vt, @%java/io/PrintStream."println(Ljava/lang/String;)V";
.callimem println_slot, out, str;
.return;
}
```

FIG. 2B

```
public static Void helloWorld(%java/lang/String[ args) {
PUSH o20(EBX):uint32
PUSH o19(EBP):uint32
MOV t3(EBX):cls:java/io/PrintStream,t2[t1(&f:java/lang/System.out)]:object
MOV t4(EBP):vtb:cls:java/io/PrintStream,t6[t3(EBX)+t5(0:vtao)]:vtb:cls:java/io/PrintStream
PUSH t11(3):int32
PUSH t10(id:cls:Hello):intptr
(AD:t12(EAX):cls:java/lang/String) =CALL t13(h:LdString):intptr
(AU:t10(id:cls:Hello):intptr,t11(3):int32)
PUSH t3(EBX):cls:java/io/PrintStream
PUSH t12(EAX):cls:java/lang/String
CALL t14[t4(EBP)+t7(vtso:java/io/PrintStream.println)]:intptr (AU:t3(EBX):cls:java/io/PrintStream,t12(EAX):cls:java/lang/String)
POP o19(EBP):uint32
POP o20(EBX):uint32
RET t15(4):int16
}
```

FIG. 2C

METHODS AND APPARATUS TO TUNE INTERMEDIATE REPRESENTATIONS IN A MANAGED RUNTIME ENVIRONMENT

FIELD OF THE DISCLOSURE

This disclosure relates generally to just-in-time compiler programs and, more particularly, to methods and apparatus to tune intermediate representations in a managed runtime environment.

BACKGROUND

Intermediate representations of programs that operate in a managed runtime environment (MRTE) may address specific platform characteristics (platform dependent) or exist in a platform neutral (platform independent) format. Platform independent code includes bytecode (e.g., Java™ bytecodes or the Common Language Interface (CLI) by Microsoft.®), which is typically a high level programming representation that does not accommodate low-level optimization opportunities. Bytecodes are typically generated from a high level programming language having a human-readable format. The bytecodes are intermediate representations that are platform independent, but much less abstract and more compact than the human-readable format from which they are derived. The bytecodes are typically compiled by a just-in-time (JIT) compiler, resulting in machine code specific to a computer platform. As such, the high level bytecodes may be distributed to many target computers without regard to the variation of the target platforms because the JIT compiler manages the details associated with the platform variations.

Because human-readable formats of code and/or bytecodes are in a high level and platform independent format, optimization of the code performance is very limited. Persons of ordinary skill in the art will appreciate an opportunity to program lower-level operations, which may include, but are not limited to, compare-and-swap operations and incrementing a garbage collection frontier pointer. Such low-level operations are typically inlined by the JIT compiler into generated code for performance enhancement. However, applying optimization at the bytecode level is usually inappropriate because either the platform neutral format of the bytecode would be destroyed or, more importantly, subsequent optimizations by the JIT compiler/bytecode verifiability would be impeded. For example, a bytecode-level optimization may improve code performance for some platforms having a JIT compiler, while hindering code performance in an alternate target JIT compiler.

Additionally or alternatively, JIT compilers may employ what are commonly referred to as magic methods to optimize code performance on specific platforms. The JIT compiler may recognize certain desired methods to be executed via the bytecodes and, subsequently, ignore such bytecodes in favor of internally generated optimized intermediate representation code that is used to produce executable code for the method. The magic methods are stored on the target machine as a part of the JIT compiler and exist as a result of the JIT compiler designer(s) identifying relatively common and/or popular methods for relatively common and/or popular platforms (e.g., mainstream methods and platforms). Thus, in view of the limited optimization capabilities of high level bytecodes, the compiler designer(s) provide optimized versions of such commonly used methods (i.e., the magic methods) to perform optimally on particular platforms used by a large percentage of the JIT compiler user-base. When the JIT compiler identifies a bytecode that matches a magic method, then the JIT compiler ignores the entire bytecode of the magic method or bytecode instruction that invokes it and, instead, generates optimized intermediate representations (either high level or low level) to produce executable code.

Although the use of magic methods allows optimized performance on specific platforms in response to platform independent bytecodes, such magic methods are available if and when the designer of the JIT compiler creates them. Like many products targeted to a mass market, product designers attempt to satisfy their largest contingency to a much higher degree than the users employing the product in a non-standard and/or unique manner. Furthermore, even when the magic methods successfully optimize various methods of the largest user-base, the user(s) may be aware of additional and/or alternate optimization techniques that the magic methods do not address. As such, the users of typical JIT compilers often rely on the JIT compiler designers for optimization techniques.

BRIEF DESCRIPTION OF THE DRAWINGS

FIG. 2A is a flow chart illustrating an example process to store tuned intermediate representations.

FIGS. 2B and 2C illustrate example high-level intermediate representation code and low-level intermediate representation code, respectively.

DETAILED DESCRIPTION

In general, example methods and apparatus for loading low-level platform independent and low-level platform dependent code into a managed runtime environment (MRTE) just-in-time (JIT) compiler are described herein. Typically, a virtual machine (VM) is a part of an MRTE that includes, among other things, a JIT compiler. The JIT compiler may be an integral part of (i.e., statically linked to) the VM or a dynamically loaded library. The example methods and apparatus disclosed herein permit a user to develop hand-tuned low-level code that may address unique optimization techniques, rather than rely upon canned magic methods or general code optimizations provided by JIT compiler designers. The example methods and apparatus further permit such hand-tuned low-level code to be loaded into the MRTE code transformation pipeline instead of the canned magic methods and/or bytecodes.

As a result, the user is provided with example methods and apparatus to express optimization techniques as high-level intermediate representation (HIR) or low-level intermediate representation (LIR) code that the JIT compiler can use for subsequent operations (including, but not limited to inlining) and code generation instead of the bytecode. Users may be limited by high-level bytecode optimization efforts, thus dependent upon the magic methods. However, users of the example methods and apparatus described herein may expose critical VM and system library operations to their own optimization techniques, as needed. The optimization techniques may include, but are not limited to, synchronization functions, native method invocation, object allocation, and array copying.

As described above, reliance upon bytecode for all optimization efforts includes significant limitations. Benefits of bytecodes include platform and VM independence, however they are typically high level languages with complex semantics of many instructions. As such, support for lower level instructions and optimizations thereof is limited and would require that all VM implementations support such optimizations. While bytecodes may operate as a widely adopted standard on many different JIT implementers, they allow less control as compared to intermediate representations, which include more simplistic semantics and-fine-grained operations.

Figure 1:
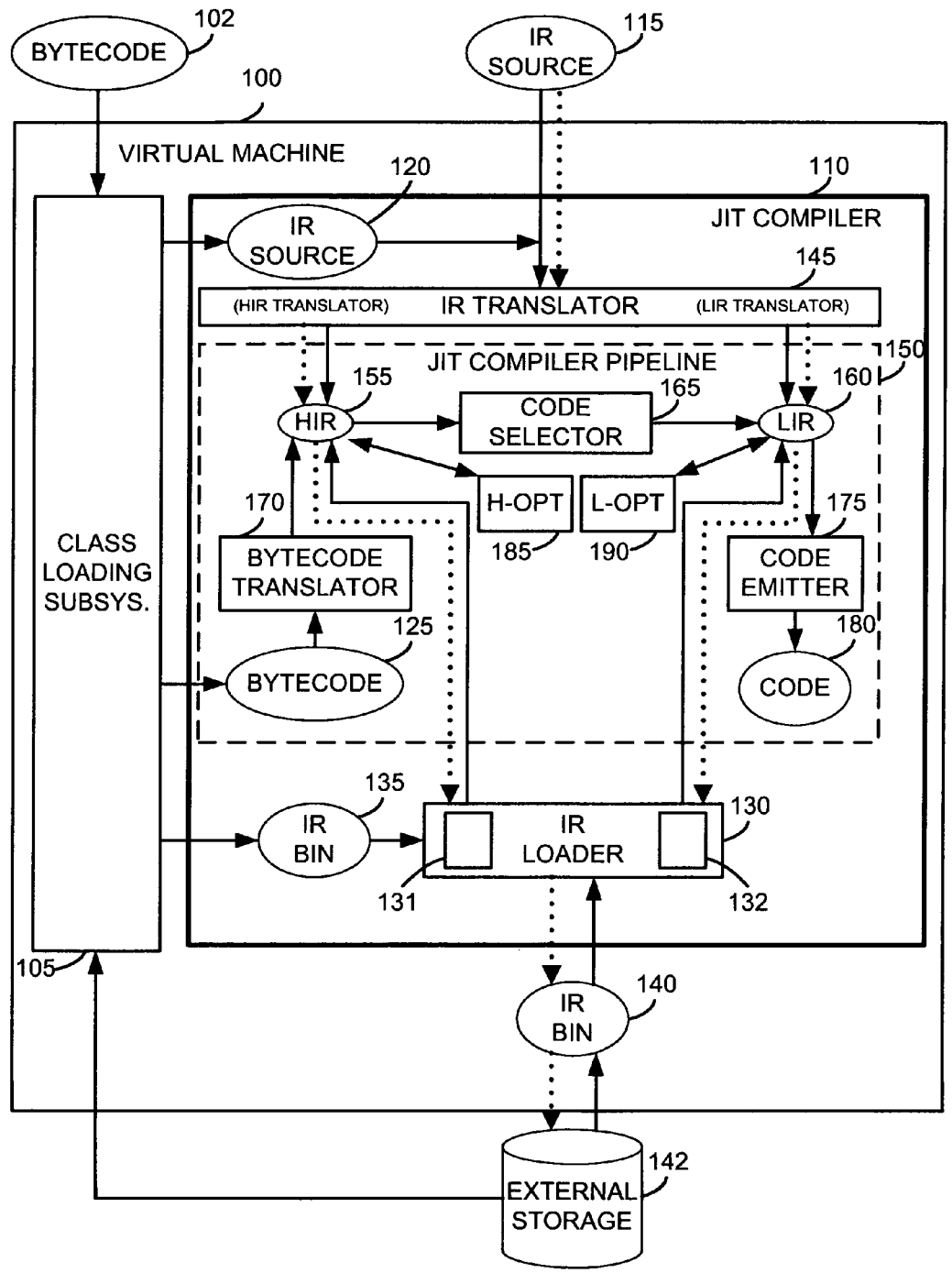
FIG. 1 is a block diagram of an example virtual machine for tuning intermediate representations in a managed runtime environment.

Referring to FIG. 1, an example VM 100 includes a class loading subsystem 105 that, among other things, locates and imports binary data for classes subsequently forwarded to a JIT compiler 110. FIG. 1 is described below with operations shown as various sized rectangles and data shown as various sized ovals. As discussed in further detail below, if the user has created optimized HIR and/or LIR, then the class loading subsystem 105 finds such stored binaries and forwards them to the JIT compiler 110 instead of bytecodes 102, 125. The JIT compiler 110 may receive IR source code 115 generated by a user (e.g., HIR source code, LIR source code), IR source code 120 from the class loading subsystem 105, bytecodes 125, and IR binaries 135, 140 from the class loading subsystem 105 or directly from a library in an external storage 142 as discussed in further detail below. Users may generate HIR and LIR source code as, for example, a text file. The example JIT compiler 110 also includes an IR translator 145, an IR loader 130, and a JIT compiler pipeline 150. The JIT compiler pipeline 150 includes in-memory HIR 155, in-memory LIR 160, a code selector 165, a bytecode translator 170, a code emitter 175, and generated code 180. Additionally, the JIT compiler pipeline 150 include a high-level optimizer (H-OPT) 185 and a low-level optimizer (L-OPT) 190).

The example VM 100 may operate in either an ahead-of-time mode or a just-in-time mode. The ahead-of-time mode allows the user to translate hand-tuned HIR and/or LIR source code 115 to a binary format for future use. For example, dotted arrows indicate various VM 100 components employed during the ahead-of-time mode, and solid arrows indicate components that may be used during the just-in-time (or runtime) mode. In particular, IR source code 115 is provided to the IR translator 145 to translate textual representations of an HIR and/or LIR program to in-memory HIR 155 representations and/or in-memory LIR 160 representations (e.g., data structures). The in-memory format is provided to the IR loader 130, which contains an HIR serializer/deserializer (SERDES) 131 to convert the HIR in-memory representations into a binary format, and vice versa (i.e., convert the HIR binary format to an HIR in-memory representation). Similarly, the IR loader 130 contains an LIR SERDES 132 to convert the LIR in-memory representations into a binary format, and vice versa (i.e., convert the LIR binary format to an LIR in-memory representation). The IR binaries 140 resulting from the HIR and/or LIR serializer 131, 132 are stored in the external storage 142 in, for example, user-defined attributes of class files or external libraries in proprietary formats.

During the run-time mode, IR binaries of the external memory are embedded into the JIT compiler pipeline 150. In particular, the class loading subsystem 105 determines if an IR binary of the method is represented in the external storage 142. If so, rather than compiling the bytecode 102, 125 with the bytecode translator 170, the IR binaries 140 are retrieved from the class loading subsystem 105 or directly from a library in an external storage 142 and deserialized into IR in-memory representations 155, 160 by the deserializers of the IR loader 130. HIR in-memory representations of the JIT compiler pipeline 150 are translated to in-memory LIR 160 by the code selector 165 during run-time, as will be appreciated by persons of ordinary skill in the art. The code emitter 175 produces machine code from the IR in-memory representations that are suitable for a target machine. Persons of ordinary skill in the art will appreciate that the IR loader 130 may check if the provided HIR/LIR binary is consistent with the bytecode that it is supposed to replace. Consistency checking may include, but is not limited to (a) verification that the IR binary was produced from the same bytecode, (b) verification of IR binary type safety, and (c) checking IR binary control flow graph structure, instructions, and operands for possible errors that may lead to platform crashes. When the class loading subsystem 105 receives a bytecode 102 during runtime and no corresponding HIR and/or LIR binaries exist in the external storage 142, then the class loading subsystem 105 allows the bytecode 102 to advance to the JIT compiler pipeline 150 for compilation by the bytecode translator 170.

IR sources 115 may also be used at runtime and are not limited to only such IR source code that was stored as a binary in the external storage 142 while the example VM 100 was in ahead-of-time mode. IR sources 115 may be loaded by the VM 100 during runtime and translated into HIR and/or LIR in-memory representations prior to platform specific machine code by the JIT compiler pipeline 150. Additionally, the IR source 120 may exist in a separate file and/or a user-defined class file attribute.

One particular advantage that the example methods and apparatus have over existing optimization approaches may include an opportunity for the user to override any managed method code with hand-tuned low-level (as opposed to bytecode) and highly optimized code. As such, the user does not need to interfere with higher level aspects of the MRTE code. Further, even if JIT compiler vendors employ an exhaustive list of magic methods in an attempt to satisfy a large portion of their customer-base, existing methods do not permit further user experimentation and/or implementation of optimization techniques. Rather than leave users at the mercy of the JIT compiler vendors marketing plans, competence, and/or thoroughness (or lack thereof), the users may proceed with varying degrees of experimentation to determine optimization techniques that work best for their systems. Such experimentation may further allow the user to thoroughly test the JIT compiler under a variety of situations, thereby permitting an iterative test and review environment for IR optimization at a low level (e.g., LIR).

The example methods and apparatus allow the users to re-write any method that is traditionally represented as bytecodes and/or magic methods, compile the new methods in HIR and/or LIR, store such optimized HIR and/or LIR methods as binaries, and plug-in such binaries during runtime. As described above, plugging-in the binaries during runtime may be handled by the class loading subsystem 105, or any other module that passes a location (e.g., a pointer) of the optimized method to the VM and/or the JIT compiler.

Benefits to VM helpers are also realized by the example methods and apparatus described herein. VM helpers, for example, are pieces of VM-dependent native code that need to be executed by managed code. This code, either generated by a JIT compiler, or provided in some form by the VM, performs some basic tasks that are highly VM-dependent. Tasks may include, but are not limited to, allocating objects on a managed heap, entering and/or exiting a monitor, and initializing a class. Because such VM helpers are typically called by the managed code, the present example methods and apparatus permit the user to take control of this process by writing IR (e.g., HIR and/or LIR), which is inlined into managed code. For example, the user may develop a custom VM helper that prevents unnecessary deep calls, resulting in a faster path of execution.

Because managed code may not be able to properly handle calling all native methods, such calls may be handled through an application programming interface (API), such as the Java™ Native Interface (JNI). JNI is a framework that allows code running in a VM to call and be called by native applications and libraries written in other languages. Similar to VM helpers, the JNI may not always provide a user with low-level control, thus optimization is limited to capabilities built into the JNI. To help reduce the traditional bottleneck that occurs during the transition from managed code to native code, users may develop HIR and/or LIR as an alternative to JNI stubs that traditionally allow safe operation of managed entities. Rather than reliance upon the JNI for management of the formal parameters of the native call, proper exception handling (should it occur in the native method), garbage collector safepoints, and/or other tasks associated with managed-to-native code transition (which may depend on a particular JNI implementation), the user is provided an opportunity to develop HIR/LIR to handle such calls in any manner they chose.

Although the foregoing discloses example methods and apparatus including, among other components, firmware and/or software executed on hardware, it should be noted that such methods and apparatus are merely illustrative and should not be considered as limiting. For example, it is contemplated that any or all of these hardware and software components could be embodied exclusively in dedicated hardware, exclusively in software, exclusively in firmware, or in some combination of hardware, firmware and/or software. Accordingly, while the following describes example methods and apparatus, persons of ordinary skill in the art will readily appreciate that the examples are not the only way to implement such systems.

FIG. 2A illustrates an example process 200 for translating hand-tuned HIR and/or LIR source code to the binary format when the example VM 100 is in the ahead-of-time mode. The IR translator 145 receives IR source (block 205) as either HIR source code and/or LIR source code. As described above, the user may provide such source code in the form of a text file, or any other file format. For example, FIG. 2B illustrates example HIR source code 250 that may be designed by the user. Persons of ordinary skill in the art will appreciate that the HIR source code 250 is generally of a lower level than bytecode, but still machine independent. On the other hand, FIG. 2C illustrates example LIR source code 260 that may be designed by the user. Such LIR source code 260 includes a greater degree of lower level detail and is typically register based in a manner that closely represents the target platform instruction set.

The IR translator 145 assembles the HIR and/or LIR source code 115 into an HIR and/or LIR in-memory format 155, 160 (block 210), and the IR loader 130 serializes the HIR and/or LIR in-memory format 155, 160 into a binary format (block 215). The binary format may be stored to the external storage 142 (block 220) for later retrieval and use at runtime.

Figure 3A:
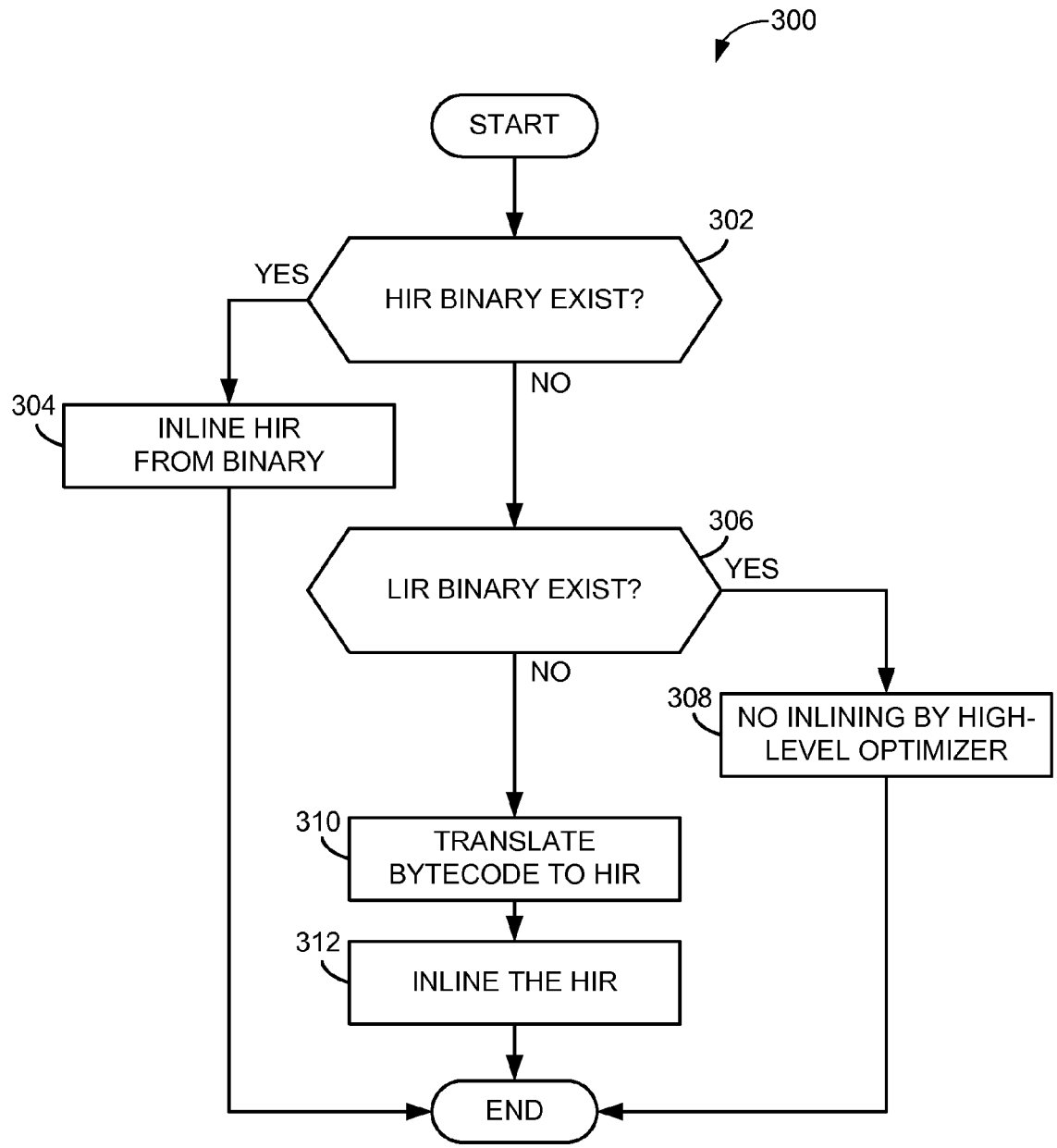
FIGS. 3A and 3B are a flow charts illustrating example processes for inlining during runtime.
Figure 3B:
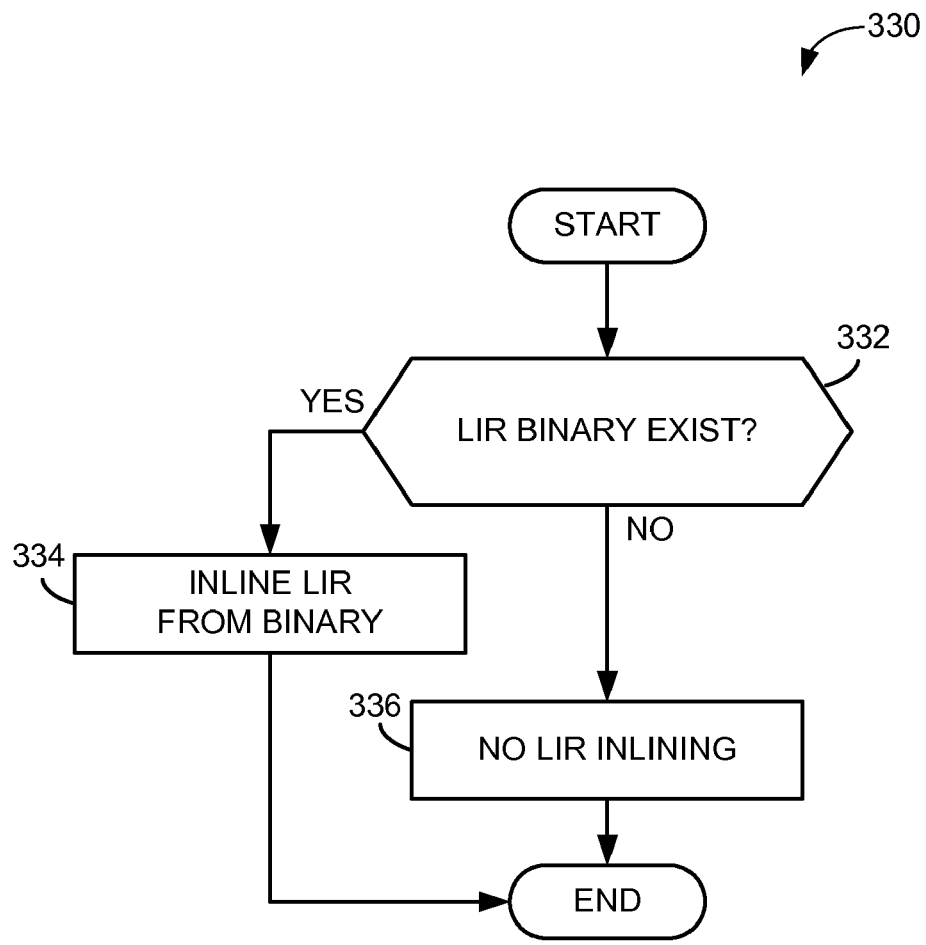
Figure 3C:
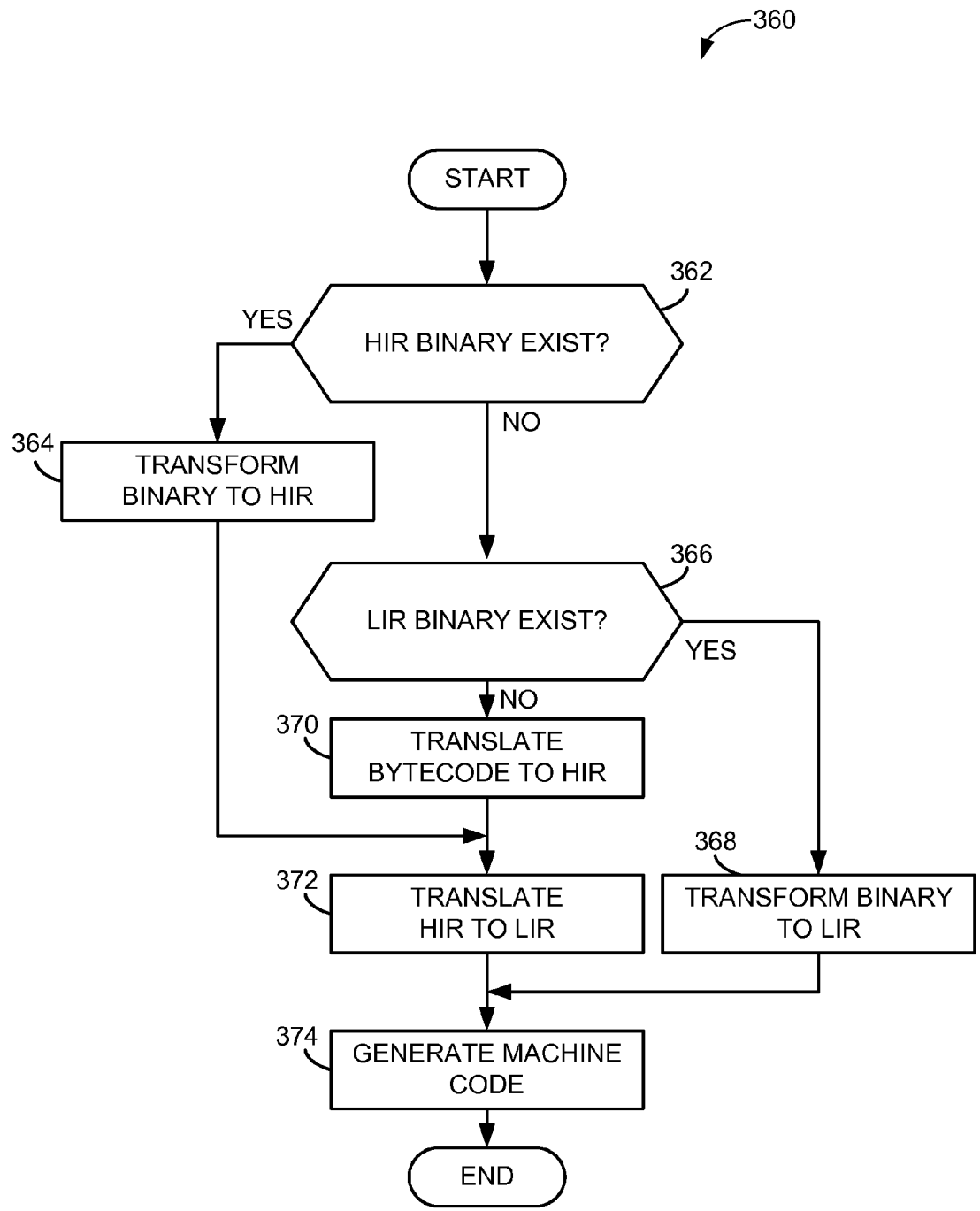
FIG. 3C is a flow chart illustrating an example process for generating machine code during runtime.

FIGS. 3A, 3B, and 3C illustrates an example processes performed by the example VM 100 during runtime. As discussed in further detail below, the example process 300 of FIG. 3A illustrates inlining of the high-level optimizer 185, the example process 330 of FIG. 3B illustrates inlining of the low-level optimizer 190, and the example process 360 of FIG. 3C illustrates method compilation of alternative representations, including HIR form, LIR form, and/or bytecode. Generally speaking, the JIT compiler 110 performs the processes of FIGS. 3A, 3B, and 3C and asks the class loading subsystem 105 whether various HIR and/or LIR implementations are available for a particular method that is to be inlined, compiled, or otherwise handled.

FIG. 3A illustrates an example process 300 for inlining of the high-level optimizer 185 during runtime. The JIT compiler 110 queries the class loading subsystem 105 to determine whether an HIR binary exists for the method (block 302). If an HIR binary does exist (such as binaries stored in the external storage 142, the JIT compiler 110, and/or the class loading subsystem 105), then it is inlined (block 304), otherwise the JIT compiler 110 queries the class loading subsystem 105 to determine whether an LIR binary exists for the method (block 306). If an LIR binary exists for the method, then no inlining is performed (block 308) by the high-level optimizer 185 because such inlining is delegated to the low-level optimizer 190, as discussed below. On the other hand, if no LIR binary exists (block 306), then the bytecode is received and translated to an HIR format (block 310) and the HIR is inlined (block 312) into the containing method.

FIG. 3B illustrates an example process 330 for inlining of the low-level optimizer 190 during runtime. The JIT compiler 110 queries the class loading subsystem 105 to determine whether an LIR binary exists for the method (block 332). If an LIR binary does exist, then it is inlined (block 334), otherwise the JIT compiler does not inline (block 336). Typically, if no LIR binary exists (block 332), then the high-level optimizer 185 handles translation of bytecode to HIR (block 310). Persons of ordinary skill in the art will appreciate that, although a single high-level optimizer 185 and a single low-level optimizer 190 are shown in FIG. 1, any number of optimizers may operate to transform any number of IRs and/or binaries.

FIG. 3C illustrates an example process 360 for method compilation of alternative representations, including HIR form, LIR form, and/or bytecode. The high-level and low-level optimizations are not shown for simplicity of explanation. The JIT compiler 110 may also generate machine code rather than inline HIR, LIR, and/or bytecode. Upon receipt of an HIR binary (block 362), the JIT compiler 110 transforms the binary to an HIR representation (block 364) with the HIR SERDES 131 of the IR loader 130. On the other hand, if the JIT compiler 110 receives an LIR binary (block 366), then the JIT compiler 110 transforms the LIR binary to an LIR representation (block 368) with the LIR SERDES 132 of the IR loader 130. When the JIT compiler 110 receives bytecode rather than an HIR and/or LIR binary, the JIT compiler 110 translates the bytecode to an HIR representation (block 370) via, for example, the bytecode translator 170. HIR representations are further translated to an LIR representation (block 372) via the code selector 165, and the code emitter 175 may thereafter generate machine code 180 (block 374).

Figure 4:
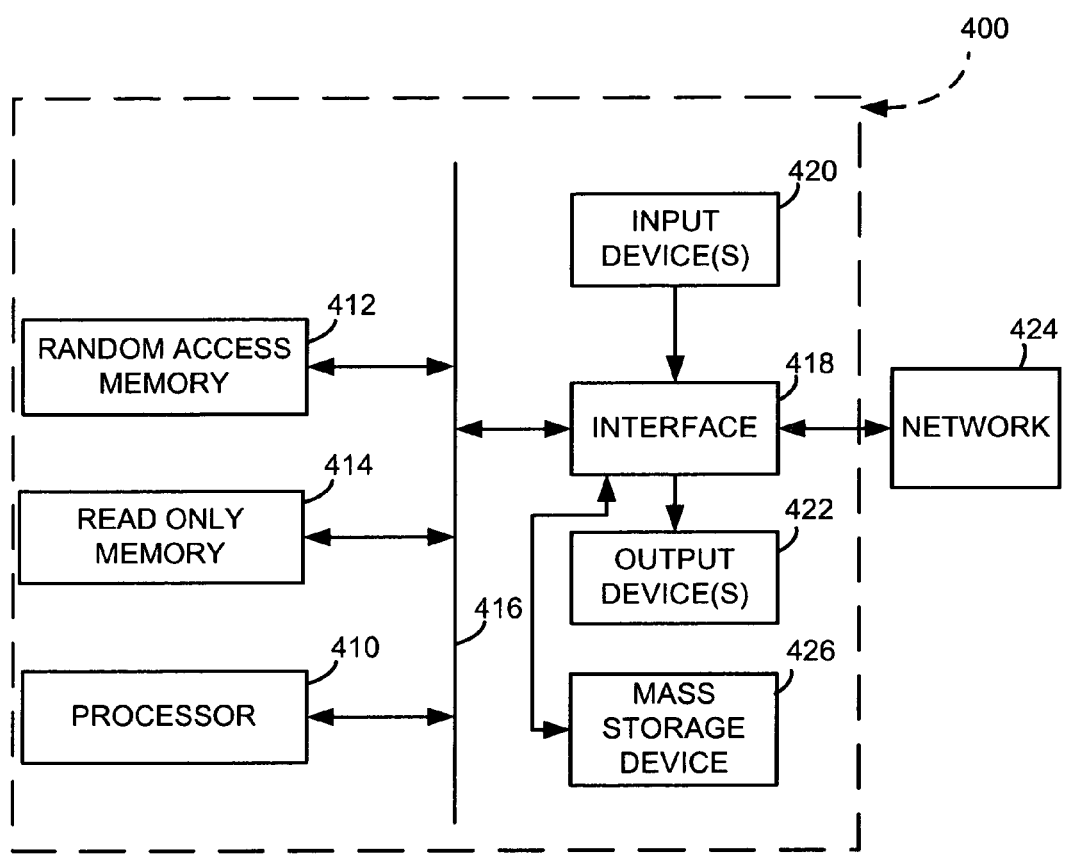
FIG. 4 is a schematic illustration of an example computer that may execute the process of FIGS. 2A, 3A, 3B, and 3C to implement the apparatus of FIG. 1.

FIG. 4 is a block diagram of an example computer system 400 capable of implementing the apparatus and methods disclosed herein. The computer system 400 can be, for example, a server, a personal computer, a personal digital assistant (PDA), or any other type of computing device.

The computer system 400 of the instant example includes a processor 410. For example, the processor 410 can be implemented by one or more Intel® microprocessors from the Pentium® family, the Itanium® family, the XScale® family, or the Centrino™ family. Of course, other processors from other families are also appropriate.

The processor 410 is in communication with a main memory including a volatile memory 412 and a non-volatile memory 414 via a bus 416. The volatile memory 412 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 414 may be implemented by flash memory and/or any other desired type of memory device. Access to the main memory 412, 414 is typically controlled by a memory controller (not shown) in a conventional manner.

The computer system 400 also includes a conventional interface circuit 418. The interface circuit 418 may be implemented by any type of well known interface standard, such as an Ethernet interface, a universal serial bus (USB), and/or a third generation input/output (3GIO) interface.

One or more input devices 420 are connected to the interface circuit 418. The input device(s) 420 permit a user to enter data and commands into the processor 410. The input device(s) can be implemented by, for example, a keyboard, a mouse, a touch screen, a track-pad, a trackball, isopoint and/or a voice recognition system.

One or more output devices 422 are also connected to the interface circuit 418. The output devices 422 can be implemented, for example, by display devices (e.g., a liquid crystal display, a cathode ray tube display (CRT), a printer and/or speakers). The interface circuit 418, thus, typically includes a graphics driver card.

The interface circuit 418 also includes a communication device such as a modem or network interface card to facilitate exchange of data with external computers via a network 424 (e.g., an Ethernet connection, a digital subscriber line (DSL), a telephone line, coaxial cable, a cellular telephone system, etc.).

The computer system 400 also includes one or more mass storage devices 426 for storing software and data. Examples of such mass storage devices 426 include floppy disk drives, hard drive disks, compact disk drives and digital versatile disk (DVD) drives.

As an alternative to implementing the methods and/or apparatus described herein in a system such as the device of FIG. 4, the methods and/or apparatus described herein may alternatively be embedded in a structure such as processor and/or an ASIC (application specific integrated circuit).

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of processing a bytecode, comprising:
receiving the bytecode at a virtual machine during runtime, the virtual machine executing on a platform and receiving the bytecode via a class loading subsystem;
determining a commonly used method associated with the received bytecode;
replacing the received bytecode with a user optimized intermediate representation stored in a memory wherein the user optimized intermediate representation is platform dependent, associated with the commonly used method and the platform, and generated by a just-in-time compiler to produce executable code for use at runtime; and
importing the user optimized intermediate representation (IR) via an intermediate representation (IR) loader as source code from the memory into the virtual machine, wherein the IR source code is at least one of a high-level IR code or a low-level IR code.

2. A method as defined in claim 1 further comprising receiving intermediate representation source code, transforming the intermediate representation source code to a binary format, and storing the binary format to the memory.

3. A method as defined in claim 2 wherein transforming the intermediate representation source code further comprises translating the intermediate representation source code to in-memory format and transforming the in-memory format to the binary format.

4. A method as defined in claim 2 wherein the received intermediate representation source code is a text file.

5. A method as defined in claim 1 further comprising ignoring the received bytecode when the user optimized intermediate representation is identified in the memory.

6. A method as defined in claim 1 further comprising compiling the received bytecode when the user optimized intermediate representation is absent from the memory.

7. A method as defined in claim 1 further comprising compiling the user optimized intermediate representation to platform dependent machine code.

8. An article of manufacturing storing machine readable instructions which, when executed, cause a machine to:
receive a bytecode at a virtual machine during runtime, the virtual machine executing on a platform and receiving the bytecode via a class loading system;
determine a commonly used method associated with the received bytecode;
replace the received bytecode with a user optimized intermediate representation stored in a memory wherein the user optimized intermediate representation is platform dependent, associated with the commonly used method and the platform, and generated by a just-in-time compiler to produce executable code for use at runtime; and
import the user optimized intermediate representation (IR) via an intermediate representation (IR) loader as source code from the memory into the virtual machine, wherein the IR source code is at least one of a high-level IR or a low-level IR.

9. An article of manufacture as defined in claim 8 wherein the machine readable instructions cause the machine to receive intermediate representation source code, transform the intermediate representation to a binary format, and store the binary format to the memory.

10. An article of manufacture as defined in claim 9 wherein the machine readable instructions cause the machine to translate the intermediate representation source code to in-memory format and transform the in-memory format to the binary format.

11. An article of manufacture as defined in claim 9 wherein the machine readable instructions cause the machine to receive the intermediate representation source code as a text file.

12. An article of manufacture as defined in claim 9 wherein the machine readable instructions cause the machine to ignore the received bytecode when the user optimized intermediate representation is identified in the memory.

13. An article of manufacture as defined in claim 9 wherein the machine readable instructions cause the machine to compile the received bytecode to platform dependent machine code when the user optimized representation is absent from the memory.

14. An article of manufacture as defined in claim 9 wherein the machine readable instructions cause the machine to compile the stored optimized intermediate representations to platform dependent machine code.

15. An apparatus to process bytecode in a managed runtime environment, the apparatus comprising:
- an intermediate representation (IR) loader to replace a received bytecode with platform dependent user optimized IR code; wherein the received bytecode is loaded via a class loading subsystem, the platform dependent user optimized IR code is stored in memory and associated with a commonly used method and the platform, and is generated by a just-in-time compiler to produce executable code for use at runtime, wherein the user optimized IR is at least one of a high-level IR or a low-level IR;
- a memory to store an IR binary received from the IR loader; and
- a code emitter to incorporate the IR binary into a runtime pipeline.

16. An apparatus as defined in claim 15 further comprising a class loading subsystem to receive bytecode and extract a method from the bytecode, the class loading subsystem to identify an associated IR binary in the memory.

17. An apparatus as defined in claim 15 further comprising at least one of a high-level IR translator to translate the high-level IR code to a high-level in-memory format or a low-level IR translator to translate the low-level IR code to a low-level in-memory format.

18. An apparatus as defined in claim 17 further comprising a high-level serializer/deserializer (SERDES) to transform the high-level in-memory format to a binary format and store the binary format in the memory.

19. An apparatus as defined in claim 17 further comprising a low-level SERDES to transform the low-level in-memory format to a binary format and store the binary format in the memory.

* * * * *